United States Patent [19]

Bernstein

[11] 3,740,673

[45] June 19, 1973

[54] BI-FILAR DELAY LINE

[75] Inventor: Howard Bernstein, New York, N.Y.

[73] Assignee: Bel Fuse Inc., Jersey City, N.J.

[22] Filed: Apr. 27, 1972

[21] Appl. No.: 247,963

[52] U.S. Cl. .............................. 333/29 R, 333/31 R
[51] Int. Cl. ........................... H03h 7/34, H03h 7/36
[58] Field of Search ................. 333/29, 31 R, 31 C, 333/23; 336/138, 137, 140, 141, 220, 186; 328/66–68

[56] References Cited

UNITED STATES PATENTS

| | | | |
|---|---|---|---|
| 3,283,269 | 11/1966 | Bernstein | 333/29 |
| 2,892,162 | 6/1959 | Bennet | 333/29 |
| 2,390,563 | 12/1945 | Tawney | 333/29 |
| 920,925 | 5/1909 | Darlington | 336/138 X |
| 3,418,606 | 12/1968 | Adams | 333/29 X |
| 342,947 | 6/1886 | Beale | 336/186 X |

*Primary Examiner*—Rudolph V. Rolinec
*Assistant Examiner*—Marvin Nussbaum
*Attorney*—Ostrolenk, Faber, Gerb & Soffen

[57] ABSTRACT

This invention involves a bi-filar wound distributed constant variable delay line, exhibiting increased delay and bandwidth performance for a given volume, as compared to presently known designs and methods. A wiper arm is used to adjust the delay. The greatly enhanced figure of merit of electrical parameters of this bi-filar device is noted at all settings of the delay line, i.e., whether the wiper arm is set for one-fourth, one-half or full delay, etc.

3 Claims, 6 Drawing Figures

BI-FILAR DELAY LINE

This invention relates to an electrical delay line and more particularly to the utilization of a bi-filar winding for forming the delay line.

In many electrical circuits it is necessary to introduce a time delay in the transmission path of signals. Various time delay networks are presently available to provide a discrete amount of delay within a practically realizable length. These time delay networks may be of the distributed constant variety and typically include an insulated support structure on which is contained a conductive ground plane and a distributive winding. The capacitative coupling between the winding and the ground plane in conjunction with the inductance of the winding establishes a distributed constant impedance to provide the desired signal delay along the length of the support structure. The required magnitude of delay may be obtained by appropriately selecting the physical characteristics of the support structure, the windings and the ground plane. If needed, additional bridge capacitative patches may be provided in a manner well known in the art.

It is frequently desirable to provide for a variation of the circuit delay introduced by the overall length of the delay line so as to permit an adjustment thereof and it is also desirable to provide trimmer means to make this adjustment after the circuit is completed with the delay line installed in the circuit. A wiper arm has been used, longitudinally translated along the winding in accordance with the segment of the overall delay line length which is to be connected or disconnected from the circuit. It has previously been found that when such a wiper arm is used a possible degradation of the system signal occurs, caused by the reflections from the unused section of the line.

In accordance with the present invention, the utilization of a bi-filar winding in conjunction with the utilization of a wiper arm for adjusting the length or trimming the delay line has the unforeseen effect of obviating the signal degradation which has previously occurred when such wiper arms have been used.

Also in accordance with this invention, the use of the bi-filar winding for the delay line permits the manufacture of a smaller device which will have the same and even better electrical characteristics than the conventional single winding. For example, in order to make a low impedance delay line, one having a characteristic impedance of 200 ohms, the common practice is to use a large wire such as a No. 33 AWG wire wound on a suitable tube, approximately 0.250 O.D. For a 200 ohm device, a 5.5 inch winding length of No. 33 wire will produce a 260 nanosecond delay with a pulse rise time of 44 nanoseconds and a bandwidth of approximately 8 megahertz; this measurement is taken at wiper arm tap fully extended. By the utilization of the bi-filar winding, in place of a single winding, on the same O.D. size form, and same wiper arm setting, it has been found that two windings of No. 39 AWG wire wound in a bi-filar manner will produce a 200 ohm delay line in a length of only 3.5 inches with a 260 nanosecond delay. In fact, the bi-filar wound device has better electrical characteristics than the longer winding of No. 33 wire, with the winding of the present invention having a 36 nanosecond rise time with a bandwidth of approximately 10 megahertz.

A primary object of the present invention therefore is the structure of a delay line made from a bi-filar winding.

Another object of the present invention is the utilization of a wiper arm for adjusting or trimming a delay line in connection with a bi-filar winding.

The foregoing and many other objects of the present invention will become apparent in the following description and drawings in which.

Figure 1:
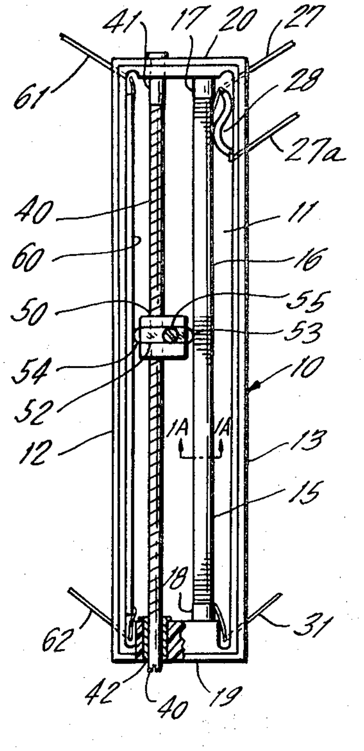
FIG. 1 is a plan view of a delay line made in accordance with the present invention.

Referring now to the drawings, the novel delay line of the present invention comprises in one illustrative embodiment a housing 10 having a bottom wall 11 and side walls 12 and 13. The open top wall may be fully enclosed by an appropriate cover.

The bi-filar coil forming the delay line 15 is wound on a suitable insulating support 16 which is carried in insulating sockets 17 and 18 in the end walls 19 and 20.

Figure 2:
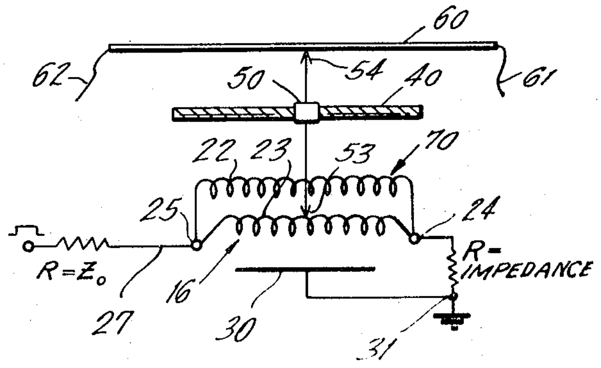
FIG. 2 is a circuit schematic of the delay line of the present invention.
Figure 4:
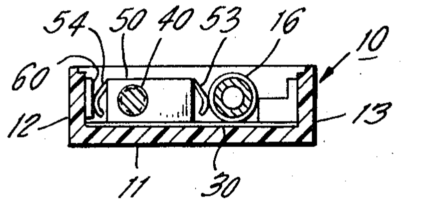
FIG. 4 is an expanded view in perspective of the wiper arm contact structure.
Figures 1A, 3, 5:
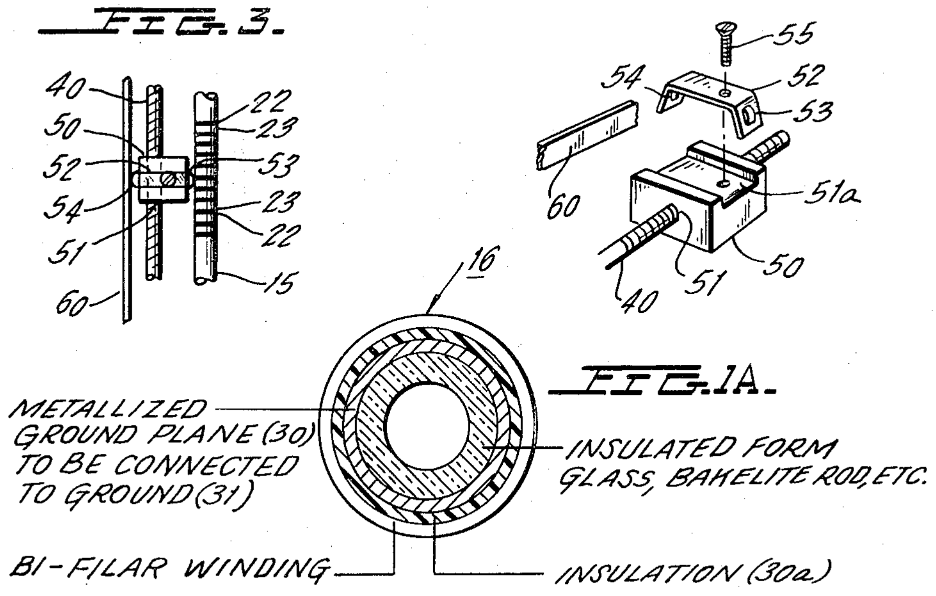
FIG. 1A is a cross-sectional view on line 1A—1A of FIG. 1, showing an enlarged view of the coil.
FIG. 3 is an enlarged view of the wiper arm contact structure and a portion of the bi-filar coil of the present invention.
FIG. 5 is a view partly in cross-section taken on line 5—5 of FIG. 1, showing the arrangement of the parts of the delay line structure.

As previously pointed out, and as may be seen more readily in FIGS. 2 and 3, the bi-filar delay line 15 is wound from two wires 22 and 23 which are interleaved on the support 16 to form an apparent single coil, the two coils being interconnected at their terminals 24 and 25.

A connector lead 27 is taken from the coil terminal 25 through the bottom wall of the housing 11 and an alternate connecting lead 27*a* may also be provided through the bottom wall of the housing connected by the wire 28 to the terminal 25. The terminal 25 of the bi-filar coils 22, 23 is contained within the sockets 17 carried by end wall 20, and is there connected in any appropriate manner, as by soldering, to the connecting lead 27.

The insulating support 16 (see FIG. 1A) may be of glass, bakelite or any suitable insulating material. A metallized ground plane 30 is wrapped thereon. Insulation 30*a* is then wrapped over the ground plane 30 and the bi-filar winding is then placed over insulation 30*a*. The ground plane 30 is connected at 31 (FIG. 1A) through the insulation 30*a* to the external circuit.

The bi-filar windings 22 and 23 have an insulating coating, generally polyurethane, so that the turns of the coils are insulated from each other.

The housing 10 also supports between the end walls 20 and 19 a rotatable screw 40 which is freely rotatable in appropriate journals 41, 42 carried by the said end walls 19 and 20. The screw body extends through the end wall 19, as seen in the partly broken away section of FIG. 1, and terminates in a slotted head 44 into which a screwdriver may be inserted to rotate the screw 40.

A block 50 of insulating material is provided with a threaded opening 51 which is in engagement with the threads of the screw 40. The insulating block 50 is recessed at 51 to receive a bridging strap 52 having a coil-engaging contact 53 and a bus-engaging contact 54. The bridging strap 52 is secured in the slot 51*a* in any suitable manner as by the screws 55.

A bus 60 is provided carried by the wall 13 of the housing. One end of the bus 60 is connected to the lead 61. The other end of the bus 60 is connected to the lead 62.

The outer surface of the bi-filar windings 23, 22 along the line against which the contact 53 is to wipe is cleared of insulation, the clearing of the insulation being performed over a few degrees of the perimeter of each wire so that no bridging from wire to wire occurs by reason thereof. The contact carrying block 50, as seen in FIGS. 1 and 5, is so supported by the screw that the contact 53 thereof engages the coil and the contact 54 thereof is in engagement with the bus 60. Since the screw 40 and the coil 15, because of their length, are slightly flexible, contact block 50 with the contacts 53, 54 has a slightly oversized dimension between the coil 15 and the bus 60 creating a very slight deformation of the screw 40 and coil 16 in order to ensure good contact. The surfaces of contacts 53 and 54 may be appropriately treated or coated to ensure that good contact is established.

The two leads 61 and 62 are provided for the bus 60 so that the installer or circuit designer may select the appropriate lead which he desires to connect into the circuit in accordance with the various parameters of the circuit in which the delay line is to be connected and in accordance with the particular physical environment of the contact block 50.

It will thus be seen from an examination of FIG. 2 that the coil 16 is effectively shortened by contacts 53, 54 which connect a portion of the coil 15 to the bus 60 and then either to the leads 61 or 62.

By this means therefore a bi-filar delay line is provided which will have an effective length as determined by the position of the contact block 50 and the contacts 53 and 54. In the circuit shown in FIG. 2 with leads 31 and 62 connected into the circuit and the remaining leads not being connected, the effective portion of the coil is that in the area marked by the arrow 70.

The utilization of the bi-filar winding as previously pointed out, not only tends to obviate the degradation of the operation of the delay line when a wiper arm is used but also increases the operating characteristics of the delay line, for any given setting providing for a greater delay time and a greater band width or correspondingly providing for the utilization of a smaller coil and therefore a smaller unit for the same delay line with, nevertheless, a greater band width than would otherwise have been expected.

In the foregoing the invention has been described in connection with an illustrative embodiment thereof. It is desired that the scope of the invention be defined not by the specific disclosures herein contained but only by the appended claims.

The embodiments of the invention in which an exclusive privilege or property is claimed are defined as follows:

1. An electrical delay line comprising a longitudinally extending support structure of insulating material;

a plurality of interleaved windings on said support structure each extending from one end of the support to the other, a ground plane for said windings, the opposite ends of each winding being connected together, a connecting lead for said opposite ends of each winding, and a connecting lead for said ground plane, said plurality of windings being bi-filar, a housing, said leads being supported by said housing, a contact carrier in said housing movable parallel to said coils and insulating support, a contact on said contact carrier engageable with said windings, and a lead from said contact;

the electrical lengths of said windings being established by the longitudinal position of said contact with respect to said windings.

2. The electrical delay line of claim 1 in which:

a screw parallel to said windings is rotatably supported in said housing;

said contact carrier being mounted on and in threaded engagement with said screw.

3. The electrical delay line of claim 2 in which:

a wall of the housing parallel to said winding and said screw carries a bus;

said screw and contact carrier being located between said bus and said housing, said lead from said first mentioned contact including an additional contact on said contact carrier electrically connected to said first mentioned contact and in wiping contact engagement with said bus, and an electrical connector secured to at least one end of said bus.

* * * * *